(Model.)
J. E. BERING.
CORN PLANTER.
No. 272,404. Patented Feb. 20, 1883.
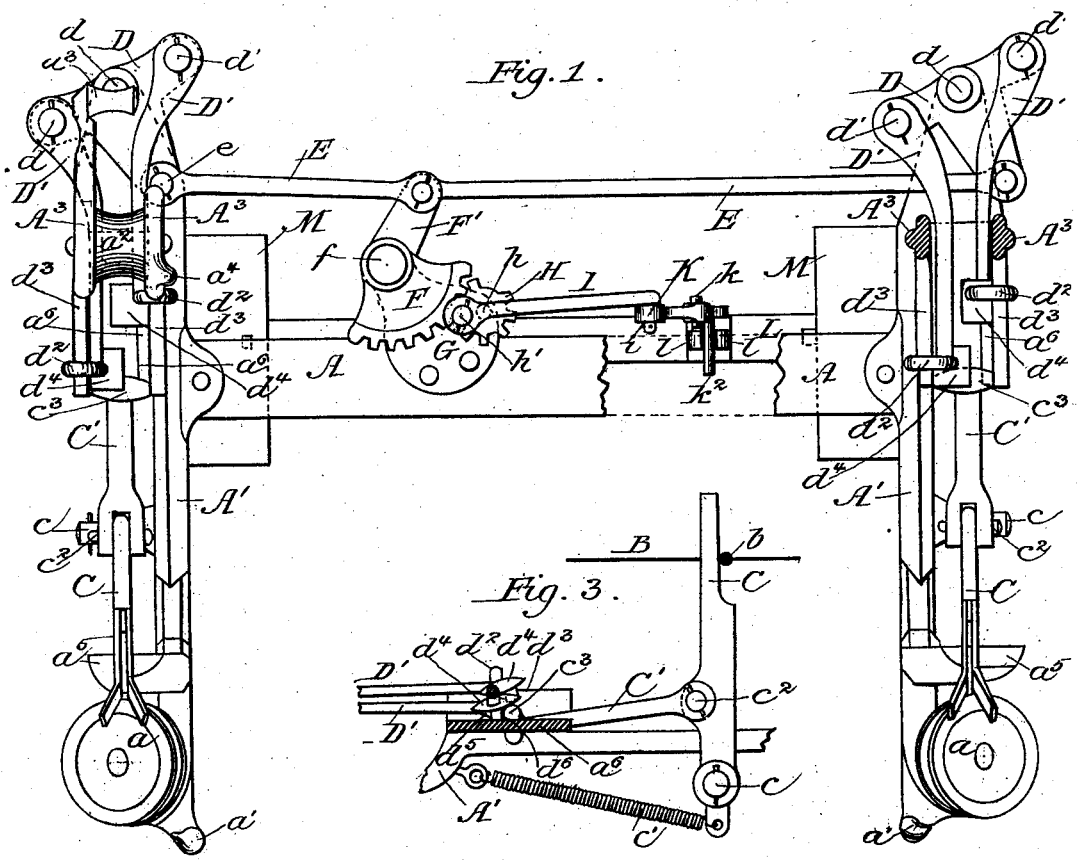
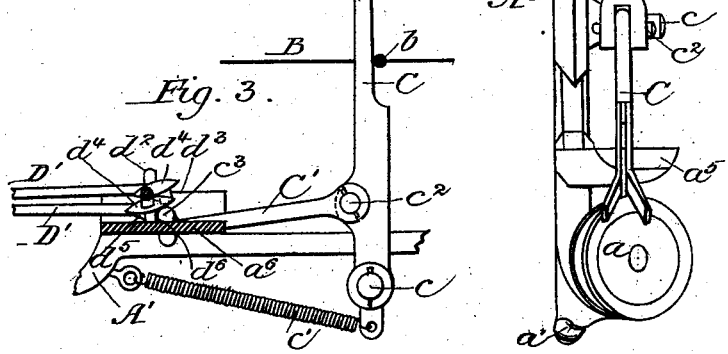
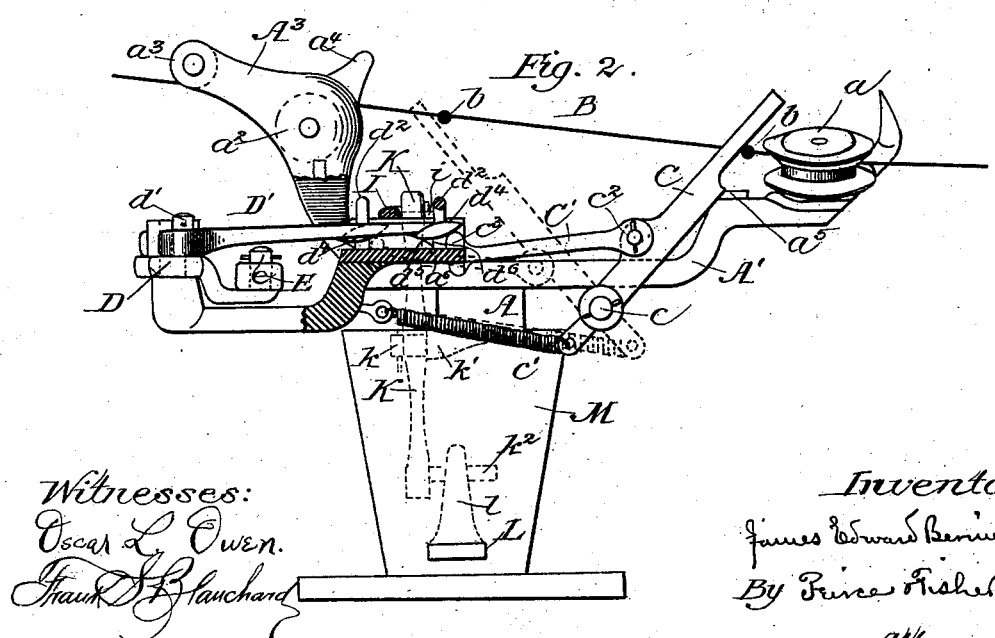
Witnesses:
Oscar L. Owen.
Frank D. Blanchard
Inventor
James Edward Bering
By Prince Fisher
Attorneys

UNITED STATES PATENT OFFICE.

JAMES E. BERING, OF DECATUR, ILLINOIS, ASSIGNOR TO CHAMBERS, BERING & QUINLAN, OF SAME PLACE.

CORN-PLANTER.

SPECIFICATION forming part of Letters Patent No. 272,404, dated February 20, 1883.

Application filed October 11, 1882. (Model.)

*To all whom it may concern:*

Be it known that I, JAMES EDWARD BERING, a citizen of the United States, residing at Decatur, county of Macon, State of Illinois, have invented certain new and useful Improvements in Corn-Planters; and I do hereby declare the following to be a full, clear, and exact description thereof, sufficient to enable others skilled in the art to which said invention appertains to make and use the same, reference being had to the accompanying drawings, in which—

Figure 1 is a plan view, Fig. 2 is a side elevation, partly in section, and Fig. 3 is a detail view, of a machine embodying my improvements.

The invention relates to corn-planters, and more especially does it relate to that class of corn-planters wherein a knotted check-row wire or cord that stretches across the field is made to actuate the seeding mechanism of the planter automatically and at regular intervals through the medium of certain devices usually mounted upon the planter as attachments thereto.

The invention consists of certain improvements in the construction and combination of these devices or attachments, substantially as hereinafter described, and particularly defined in claims.

Referring to the drawings, in which like letters designate like parts, A represents the ordinary bar attached transversely to the planting-machine, and carrying at its ends the head-bars A' A'. The head-bars have at their front ends the usual guide-pulleys $a$ and projecting fingers $a'$, and near their rear ends have two upright arms or standards, $A^3$, between which are journaled the guide-pulleys $a^2$, an extension of one of the arms $A^3$ serving to support the journal of guide-pulley $a^3$ while the other of said arms $A^3$ bears the projecting finger $a^4$. These several pulleys and fingers, as well understood, serve to sustain the knotted check-row cord or wire B in position to actuate the forked lever C and to prevent the lateral displacement of the cord or wire by reason of any devious course or sudden jolting of the machine as it traverses the field. The lever C is pivoted to the head-bar A', as at $c$, a recoil-spring, $c'$, being attached to the lower end of the lever and to the head-bar, respectively, so that after the knot $b$ of the cord B has passed free from the fork of the lever (see dotted lines, Fig. 3) the lever will be returned again quickly to its rest $a^5$, projecting from the bar A', and be in readiness to catch the next knot of the cord.

Pivotally joined to a lug or projection of the lever C, as at $c^2$, is a pitman, C', having at its opposite end a cross-head, $c^3$, which embraces and reciprocates in the elevated ways or bearings $a^6$ formed in the head-bar A'.

To the rear end of the head-bar A' is pivoted a rock-plate or bell-crank lever D, as at $d$, which said plate carries the pawls D' D', loosely pivoted thereto, as at $d'$, these pawls being sustained at their front ends by the guards $d^2$, which are bent over and ride upon the straight parallel tracks $d^3$, projecting above the head-bar A'. The pawls D' are curved slightly downward on their under side, as at $d^5$, and each terminates in a somewhat enlarged straight face, as at $d^6$, against which the cross-heads $c^3$ may snugly abut when reciprocated.

Projecting laterally from the inner side of each pawl D' are the overlapping cams $d^4$, made substantially of double-convex slope in cross-section, and adapted to bear against each other, as hereinafter described.

To the forward arm of the rocker-plate D there is pivoted, as at $e$, a connecting-rod, E, which, at its opposite end, is pivoted to the bent crank-arm F' of a sector gear-wheel, F, pivotally mounted, as at $f$, on a stud projecting from a plate, G, attached to the transverse bar A. A stud-pin, $h$, projecting from the plate G, journals a pinion, H, which meshes with the sector-wheel F, and has its gear-teeth equal in number to those of said wheel.

To a wrist-pin, $h'$, projecting above the pinion H, is pivoted the connecting-rod I, the other end of which may be bent, as at $i$, to enter a perforation in the upper end of lever K, said lever having its fulcrum-pin K on an arm or bracket, K', projecting from the lower side of the transverse bar A, and engaging by pin $K^2$, secured near its lower end, with the bifurcated arm $l$ of the reciprocating bar L, that connects with and operates the seed-slides in the hoppers M.

The several parts being constructed and arranged as hereinbefore described and the machine in readiness to traverse the field, the check-row cord or wire B is arranged in position, as shown in Fig. 2, so that it shall be received within the fork of the lever C. As the knots $b$ upon the cord or wire meet the forward or forked end of the lever C in succession, they force said end of the lever backward about its pivot $c$, and in consequence the pitman C′ is carried back with said lever, the cross-head $C^3$ of the pitman moving evenly in the ways $a^6$, and abutting against the straight face $d^6$ of that pawl, D′, which chances to be at the forward end of the tracks $d^3$. Said pawl D′ is in turn forced backward, thus causing the plate D to oscillate about its axis $d$, moving thereby the connecting-rod E, sector and pinion gear F H, rod I, lever K, bar L, and seed-slides in hoppers M. During the period that the pawl D′ is being forced backward by operation of the pitman C to oscillate the plate D its fellow pawl, D′, on said plate is being advanced thereby to an extreme forward position in the tracks $d^3$, whereupon, as the pawls near each other, the cam $d^4$, attached to the advancing pawl, overrides the cam $d^4$ of the receding pawl, and thus lifts said advancing pawl so that its face $d^6$ freely clears the cross-head $c^3$, and no obstruction or locking of the parts occurs. The bent guard $d^2$ of the pawl allows the same to be lifted, as described, without risk of displacing said pawl from position on the track $d^3$. The knot $b$ on cord B having carried the lever C backward so far that the fork of the lever no longer retains the knot, but allows it to slip away freely, the lever is quickly returned again to its original position by action of the spring $c'$, (full lines, Fig. 2,) and with it returns the pitman C′, the cross-head $c^3$ of which, when it meets the down curve $d^5$ of the forward pawl, D′, lifting said pawl and dropping it again abruptly when it has cleared the front end of the pawl, so that the straight face $d^6$ thereof shall be snugly in position and abutting squarely against the cross-head $c^3$, preparatory for the return stroke.

The present invention is designed as an improvement upon Letters Patent No. 207,251, issued to W. B. Chambers and T. E. Bering, August 20, 1878, and differs therefrom in essential particulars, viz: the forked lever C is made to reciprocate the pitman C′, as heretofore described, in lieu of operating a rock-shaft and tappet, as in the older construction. The pitman is at the end of its backward stroke about the time the lever C reaches a perpendicular position, and hence, if the knot $b$ should slip away from the fork prematurely at this stage, the slide-bar L will yet have been operated to its full throw, and even planting of the corn be thus assured; whereas in the older form it was necessary that the forked lever should be rocked backward by the knotted cord or wire much farther than just stated, otherwise the tappet would not throw the pawls a full stroke, and the seeding be correspondingly imperfect. Such imperfection must necessarily result at times if, for any reason, the cord were to slip away prematurely from the clasp of the forked lever. The relation of pitman-pivot $c^2$ to the forked lever-pivot $c$ is such that, as already stated, the pitman accomplishes its full throw shortly after the forked lever passes the vertical. Consequently, during the rest of the backward movement of the forked lever, the cross-head of the pitman stands practically at rest in the ways and meets no further resistance from the pawls rock-plate, pinion, &c. It is plain that the strain on the forked lever, as on the knotted cord, is thereby relieved much earlier than was possible in the older form of machine. Again, by having the sector and pinion gear G H distinct from the rock-plate D, instead of being a part thereof, as heretofore, more freedom in movement is secured, at the same time the locking of the seed-slides in hopper M against accidental jars or strains is maintained, for, as to this latter, it will be noted that when the sector-wheel F has rotated pinion H in either direction, at the end of the movement the connecting-rod I will be at its dead-point with respect to wrist-pin $h'$, so that lever K, reciprocating bar L, and seed-slides are immovably held and not to be operated, except as sector-wheel F acts through the medium of rocker-plate D, pawls D′, and pitman C′ to rotate pinion H reversely again through one-half revolution. The loss of seed through accidental displacement of the slides is thereby guarded against.

Not restricting myself to the precise details of structure herein set forth, and having thus described the invention, what I claim as new and desire to secure by Letters Patent, is—

1. In a check-row corn-planter, the combination, with the forked lever and with a pivoted pitman having a cross-head sustained in guideways, of the parallel reciprocating pawls and a rock-plate, the relation of the parts being such that the strain on the forked lever is relieved shortly after the pitman has passed the vertical, substantially as described.

2. In a check-row corn-planter, the combination, with the rock-plate and sector and pinion gear, of a connecting-rod joining said plate and gear, the seed-slide lever, and a connecting-rod joining the same to the gear, substantially as described.

3. In a check-row corn-planter, the combination, with forked lever C and with pitman C′, having a cross-head, $c^3$, mounted in ways, $a^6$, of the reciprocating pawls D′, pivoted to rock-plate D and provided with the guards $d^2$ and overlapping cams $d^4$, substantially as described.

4. In a check-row attachment for corn-planters, the combination, with a lever to receive the check-row wire or cord, of a pitman, reciprocating pawls, a rock-plate, a sector and pinion gear, and a lever to operate the seed-slides, the gear being severally joined to the plate and seed-slide lever by suitable connecting-rods, all substantially as set forth.

5. In a check-row attachment for corn-planters, the combination, with the head-bar having the usual guides for the wire or cord, of a forked lever, a pitman pivoted thereto and carrying a cross-head to engage with ways in said head-bar, reciprocating pawls sustained on tracks of said head-bar, and a rock-plate pivoted thereto, substantially as described.

In testimony whereof I have hereunto set my hand this 7th day of October, 1882.

JAMES EDWARD BERING.

Witnesses:
JULIUS BROEHL,
W. E. HENKLE.